United States Patent
Goodell et al.

(10) Patent No.: US 11,206,181 B1
(45) Date of Patent: Dec. 21, 2021

(54) SAFE OVERSUBSCRIPTION OF CONNECTION TRACKING ENTRIES

(71) Applicant: Amazon Technologies, Inc., Seattle, WA (US)

(72) Inventors: David James Goodell, Seattle, WA (US); Andrew Davenport, Bellevue, WA (US); Benjamin Serebrin, Sunnyvale, CA (US); James Watson, Cape Town (ZA); Ariana Meika Morgan, Seattle, WA (US); Rajeevardhan Gopalan, Seattle, WA (US)

(73) Assignee: Amazon Technologies, Inc., Seattle, WA (US)

(*) Notice: Subject to any disclaimer, the term of this patent is extended or adjusted under 35 U.S.C. 154(b) by 0 days.

(21) Appl. No.: 17/023,844

(22) Filed: Sep. 17, 2020

(51) Int. Cl.
| | |
|---|---|
| *H04L 12/24* | (2006.01) |
| *H04L 12/911* | (2013.01) |
| *H04L 29/08* | (2006.01) |
| *H04L 12/927* | (2013.01) |
| *G06F 9/455* | (2018.01) |

(Continued)

(52) U.S. Cl.
CPC ...... *H04L 41/0813* (2013.01); *G06F 9/45558* (2013.01); *G06F 9/5011* (2013.01); *H04L 47/781* (2013.01); *H04L 47/801* (2013.01); *H04L 47/828* (2013.01); *H04L 67/32* (2013.01); *G06F 9/45533* (2013.01); *G06F 9/4881* (2013.01); *G06F 9/5027* (2013.01); *G06F 9/5072* (2013.01); *G06F 9/5077* (2013.01); *H04L 29/06* (2013.01); *H04L 29/08144* (2013.01); *H04L 41/00* (2013.01); *H04L 41/0896* (2013.01); *H04L 41/5054* (2013.01); *H04L 47/765* (2013.01); *H04L 47/788* (2013.01); *H04L 67/10* (2013.01); *H04L 67/1002* (2013.01); *H04L 67/34* (2013.01)

(58) Field of Classification Search
CPC ............ G06F 9/45558; G06F 9/45533; G06F 9/5027; G06F 9/5077; G06F 9/5011; G06F 9/5072; G06F 9/4881; H04L 29/06; H04L 29/08144; H04L 67/1002; H04L 41/0813; H04L 41/0896; H04L 41/5054; H04L 47/765; H04L 47/788; H04L 29/08171; H04L 41/00; H04L 67/10
See application file for complete search history.

(56) References Cited

U.S. PATENT DOCUMENTS 9,774,489 B1* 9/2017 Gupta ..................... H04L 67/34
10,686,677 B1* 6/2020 Ward, Jr. ............ H04L 41/5054
(Continued)

*Primary Examiner* — Kyung H Shin
(74) *Attorney, Agent, or Firm* — Nicholson De Vos Webster & Elliott LLP

(57) ABSTRACT

Techniques for safe oversubscription of connection tracking entries are described. A method for safe oversubscription of connection tracking entries may include receiving a request for an allocation of a resource on a physical host in a provider network, the request received by a resource allocation monitor from an instance hosted by the physical host, determining a resource availability on the physical host, the resource availability based on a total amount of the resource on the physical host, a reserved amount of the resource to a plurality of instances hosted by the physical host, and a shared amount of the resource, and granting or denying the resource allocation based at least on the determined resource availability.

20 Claims, 8 Drawing Sheets

(51) Int. Cl.
*G06F 9/50* (2006.01)
*H04L 29/06* (2006.01)
*H04L 12/919* (2013.01)
*G06F 9/48* (2006.01)

(56) References Cited

U.S. PATENT DOCUMENTS

2011/0213885 A1* 9/2011 Kelkar .................. G06F 9/5011
709/226
2013/0304923 A1* 11/2013 Clay ................... G06F 9/45558
709/226

* cited by examiner

```
struct nx_conntrack *alloc_conntrack(struct nx_conntrack_zone *zone)
{
if (zone->nr_entries > zone->reserved_entries &&
(table->nr_free <=
(table->total_reserved_entries - table->nr_reserved_entries_allocated)}
{
// increment counter 1
return NULL;
}
if (zone->nr_entries > zone->max_entries) {
// increment exiting counter (Device), conntrack_full_drops
return NULL;
}
struct conntrack *ct;
ct = get_new_ct();
if (ct == NULL) {
if (zone->nr_entries < zone->reserved_entries) {
// increment counter 2
} else {
// increment counter 3
}
}
zone->nr_entries++;
init_ct(ct);
return ct;
}
```

*FIG. 4*

SAFE OVERSUBSCRIPTION OF CONNECTION TRACKING ENTRIES

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, data centers housing significant numbers of interconnected computing systems have become commonplace, such as private data centers that are operated by and on behalf of a single organization, and public data centers that are operated by entities as businesses to provide computing resources to customers. Some public data center operators provide network access, power, and secure installation facilities for hardware owned by various customers, while other public data center operators provide "full service" facilities that also include hardware resources made available for use by their customers. However, as the scale and scope of typical data centers has increased, the tasks of provisioning, administering, and managing the physical computing resources have become increasingly complicated.

The advent of virtualization technologies for commodity hardware has provided benefits with respect to managing large-scale computing resources for many customers with diverse needs, allowing various computing resources to be efficiently and securely shared by multiple customers. For example, virtualization technologies may allow a single physical computing machine to be shared among multiple users by providing each user with one or more virtual machines hosted by the single physical computing machine, with each such virtual machine being a software simulation acting as a distinct logical computing system that provides users with the illusion that they are the sole operators and administrators of a given hardware computing resource, while also providing application isolation and security among the various virtual machines. Furthermore, some virtualization technologies are capable of providing virtual resources that span two or more physical resources, such as a single virtual machine with multiple virtual processors that spans multiple distinct physical computing systems. As another example, virtualization technologies may allow data storage hardware to be shared among multiple users by providing each user with a virtualized data store which may be distributed across multiple data storage devices, with each such virtualized data store acting as a distinct logical data store that provides users with the illusion that they are the sole operators and administrators of the data storage resource.

BRIEF DESCRIPTION OF DRAWINGS

Various embodiments in accordance with the present disclosure will be described with reference to the drawings, in which:

FIG. 4 is a diagram illustrating an example pseudocode algorithm for safe oversubscription of connection tracking entries according to some embodiments.

DETAILED DESCRIPTION

Figure 1:
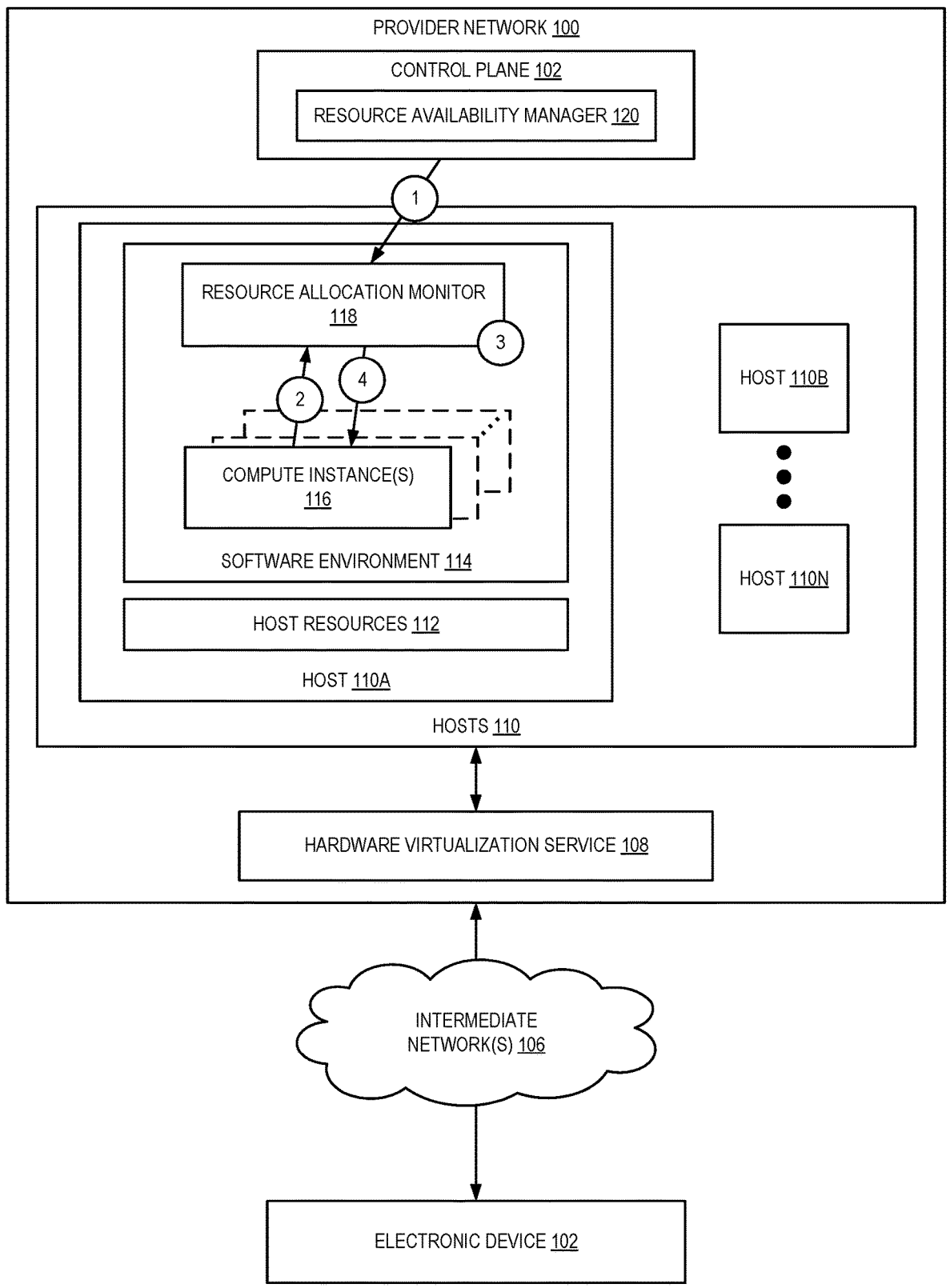
FIG. 1 is a diagram illustrating an environment for safe oversubscription of resources according to some embodiments.

The present disclosure relates to methods, apparatus, systems, and non-transitory computer-readable storage media for safe oversubscription of resources in a provider network. Virtualization service providers often offer a range of virtual machine or compute instances that have varying levels of performance and cost. The provider's customers can select a particular compute instance type to launch within the provider's network and configure the launched compute instance to execute the customer's software. In a multi-tenant environment, the compute instances of multiple customers may be launched on the same physical host, and the underlying physical resources of a given host may be virtualized and shared among the compute instances launched on that host. However, it can be difficult for the provider network to guarantee the amount of a given resource that is available to a given customer's instance reliably, while also maintaining a high utilization rate of those resources. For example, each instance could be guaranteed a certain proportion of the resources available on a physical host, but some instances may underutilize those guaranteed resources while other instances may, at least at times, want to use more than their guaranteed amount of resources.

To address these and other challenges, various embodiments provide approaches for providing safe oversubscription of resources by compute instances on a physical host. For a given resource, the resource can be divided into a reserved resource pool and a shared resource pool. When new compute instances are launched on a particular host, the availability of one or more resource types (e.g., the total amount of a given resource minus the total reserved amount of that resource that have been reserved to other compute instances launched on that host) can be determined and the new compute instance is launched if there are sufficient available resources to guarantee a reserved amount of a given resource associated with that new compute instance. Once launched, the amount of resources being consumed by the compute instances on the host can be monitored to ensure that each compute instance can still be guaranteed its reserved amount. So long as this guarantee is met, then individual instances can oversubscribe to the resource (e.g., use more than their reserved amount).

The techniques described herein improve overall resource utilization on a given host while also reliably guaranteeing a reserved amount of resources for each instance. For example, most compute instances on a given host may under-utilize their reserved resources, while a few compute instances may be associated with heavy resource usage which exceeds their reserved resource amount. Embodiments enable those compute instances that user more than their reserved resources (e.g., oversubscribe to a particular resource) to utilize resources that have been associated with the shared pool in addition to the resources that are associated with the reserved pool. In some embodiments, the total amount of a given resource can be divided in half, into the reserved pool and the shared pool. Alternatively, the shared pool and reserved pool may be differently sized, depending on observed resource utilization, customer demand, etc. In some embodiments, the reserved pool may be rigidly divided among compute instances with no sharing between instances, while the shared pool can be accessed by any compute instance. Whatever portion of the reserved pool a compute instance gets would be guaranteed, while the availability of resources from the shared pool may be allocated on a first-come first-served basis.

FIG. 1 is a diagram illustrating an environment for safe oversubscription of resources according to some embodiments. A provider network 100 (or, "cloud" provider network) provides users with the ability to utilize one or more of a variety of types of computing-related resources such as compute resources (e.g., executing virtual machine (VM) instances and/or containers, executing batch jobs, executing code without provisioning servers), data/storage resources (e.g., object storage, block-level storage, data archival storage, databases and database tables, etc.), network-related resources (e.g., configuring virtual networks including groups of compute resources, content delivery networks (CDNs), Domain Name Service (DNS)), application resources (e.g., databases, application build/deployment services), access policies or roles, identity policies or roles, machine images, routers and other data processing resources, etc. These and other computing resources may be provided as services, such as a hardware virtualization service 108 that can execute compute instances, a storage service that can store data objects, etc.

To provide these and other computing resource services, provider networks 100 often rely upon virtualization techniques. For example, virtualization technologies may be used to provide users the ability to control or utilize compute resources (e.g., a "compute instance" such as a VM using a guest operating system (O/S) that operates using a hypervisor that may or may not further operate on top of an underlying host O/S, a container that may or may not operate in a VM, a compute instance that can execute on "bare metal" hardware without an underlying hypervisor), where one or multiple compute resources can be implemented using a single electronic device. Thus, a user may directly utilize a compute resource (e.g., provided by a hardware virtualization service) hosted by the provider network to perform a variety of computing tasks. Additionally, or alternatively, a user may indirectly utilize a compute resource by submitting code to be executed by the provider network (e.g., via an on-demand code execution service), which in turn utilizes one or more compute resources to execute the code—typically without the user having any control of or knowledge of the underlying compute instance(s) involved.

The hardware virtualization service 108 (referred to in various implementations as an elastic compute service, a virtual machines service, a computing cloud service, a compute engine, or a cloud compute service) can enable users of the provider network 100 to provision and manage compute resources such as virtual machine instances. Virtual machine technology can use one physical server to run the equivalent of many servers (each of which is called a virtual machine), for example using a hypervisor, which may run at least on an offload card of the server (e.g., a card connected via PCI or PCIe to the physical CPUs and other components of the virtualization host may be used for some virtualization management components. Such an offload card of the host can include one or more CPUs that are not available to customer instances, but rather are dedicated to instance management tasks such as virtual machine management (e.g., a hypervisor), input/output virtualization to network-attached storage volumes, local migration management tasks, instance health monitoring, and the like). Virtual machines are commonly referred to as compute instances or simply "instances." As used herein, provisioning a virtual compute instance generally includes reserving resources (e.g., computational and memory resources) of an underlying physical compute instance for the client (e.g., from a pool of available physical compute instances and other resources), installing or launching required software (e.g., an operating system), and making the virtual compute instance available to the client for performing tasks specified by the client.

For example, the hardware virtualization service 108 allows multiple compute instances (e.g., VMs) 116 of one or more customers to share the same underlying computer system in the pool of instance-hosting computer systems (e.g., "hosts") 110 (including, for example, hosts 110A-N, as shown in FIG. 1). Customers interact with the hardware virtualization service 108 via an interface. For example, a customer electronic device 104 sends messages to and receives messages from the hardware virtualization service 108 across one or more intermediate networks (e.g., the internet) 106. The users (or "customers") of provider networks 100 may utilize one or more user accounts that are associated with a customer account, though these terms may be used somewhat interchangeably depending upon the context of use. Users may interact with a provider network 100 across one or more intermediate networks 106 (e.g., the internet) via one or more interface(s), such as through use of application programming interface (API) calls, via a console implemented as a website or application, etc. An API refers to an interface and/or communication protocol between a client and a server, such that if the client makes a request in a predefined format, the client should receive a response in a specific format or initiate a defined action. In the cloud provider network context, APIs provide a gateway for customers to access cloud infrastructure by allowing customers to obtain data from or cause actions within the cloud provider network, enabling the development of applications that interact with resources and services hosted in the cloud provider network. APIs can also enable different services of the cloud provider network to exchange data with one another. The interface(s) may be part of, or serve as a front-end to, a control plane 102 of the provider network 100 that includes "backend" services supporting and enabling the services that may be more directly offered to customers.

For example, a cloud provider network (or just "cloud") typically refers to a large pool of accessible virtualized computing resources (such as compute, storage, and networking resources, applications, and services). A cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

Generally, the traffic and operations of a provider network may broadly be subdivided into two categories: control plane operations carried over a logical control plane and data plane operations carried over a logical data plane. While the data plane represents the movement of user data through the distributed computing system, the control plane represents the movement of control signals through the distributed computing system. The control plane generally includes one or more control plane components distributed across and implemented by one or more control servers. Control plane traffic generally includes administrative operations, such as system configuration and management (e.g., resource placement, hardware capacity management, diagnostic monitoring, system state information). The data plane includes customer resources that are implemented on the provider network (e.g., computing instances, containers, block storage volumes, databases, file storage). Data plane traffic generally includes non-administrative operations such as transferring customer data to and from the customer resources. The control plane components are typically implemented on a separate set of servers from the data plane servers, and control plane traffic and data plane traffic may be sent over separate/distinct networks.

The instance-hosting computer systems (e.g., hosts) 110 can host multiple compute instances (e.g., compute instances 116). The hosts 110 include underlying physical components to support compute instances 116. Such components may include general purpose processors (e.g., a central processing unit (CPU)), memory (e.g., random-access memory (RAM)), special purpose processors (e.g., accelerators), block I/O storage (e.g., disk or solid-state storage drives), network interfaces, and the like. Each of these components may offer a certain level of performance, which is shared amongst one or more compute instances 116. To facilitate such sharing, the compute instances 116 operate in a software environment 114 such as a hypervisor, a hypervisor executing within a host operating system (OS), a virtual machine manager (VMM), or the like, that controls access to the underlying physical components of the computer systems 110 by the compute instances 116. The compute instances 116 execute customer software, which may include an operating system and one or more applications, some of which may be licensed by third parties. From the perspective of a host OS within which the compute instances 116 operate, an operating system executed by a compute instance 116 may be considered a guest OS.

FIG. 1 illustrates host 110A in greater detail than the other hosts 110B-N of the provider network 100. In particular, the host 110A includes a software environment 114 that hosts compute instances 116 (e.g., using the above-described virtualization techniques) and includes a resource allocation monitor 118. The resource allocation monitor 118 monitors the usage of the underlying resources 112 of the host 110A by the compute instances 116. In some embodiments, the usage information is relative to logical divisions of the underlying physical components of computer system (e.g., a single physical CPU may host multiple virtual CPUs). In some embodiments, the resource allocation monitor 118 can obtain per-compute instance resource usage of various resources 112, such as CPU, GPU, memory, network, or other resource usage information from kernel- or hypervisor-managed data within the software environment 114. For example, a host OS may include system libraries that allow the resource allocation monitor 118 to obtain per-process CPU, memory, network, etc. resource usage. Usage information may be absolute (e.g., gigabytes of memory, number of input/output operations per second) or relative (e.g., percentage of CPU usage, CPU core usage, or virtual CPU usage, percentage bandwidth usage, etc.).

In some embodiments, each resource type (e.g., CPU, GPU, bandwidth, network connections, connection tracking entries, connection caching entries, etc.) may be associated with a resource zone, where each resource zone has been allocated a particular amount of resources that may be utilized by components assigned to that zone. In some embodiments, a resource zone may correspond to a compute instance. In some embodiments, a resource zone may correspond to multiple compute instances or to less than a compute instance. For example, a single compute instance may span multiple zones.

In some embodiments, a hypervisor and the resource allocation monitor 118 are executed within an operating system environment executed on one or more processors of the host 110A. In some embodiments, the resource allocation monitor 118 is part of the hypervisor. In some embodiments, the compute instances 116 are executed by the same one or more processors executing the hypervisor and resource allocation monitor 118. In other embodiments, the compute instances 116 are executed by a separate one or more processors than the one or more processors executing the hypervisor and/or resource allocation monitor 118. One or more software drivers handle communications between the separated processors and facilitate the collection of resource usage information by the usage monitor agent 154.

In some embodiments, the resource allocation monitor 118 can obtain per-compute instance resource usage values and aggregate resource usage values for combined resource usage of the compute instances 116 hosted by host 110A, and the resource allocation monitor 118 can send the resource usage information to a resource availability manager 120 (e.g., by making an API call to the resource availability manager 120 or by making an API available that the resource availability manager 120 can query to obtain the resource usage information). This resource usage information can be used by the control plane 102 when a new compute instance is being placed on a host to ensure that there are sufficient available resources on that host to guarantee a reserved amount of resources for that compute instance.

In some embodiments, when a new instance is placed on a host, a resource zone (or multiple resource zones) can be established and the new compute instance can be assigned to that resource zone. As shown at numeral 1, the control plane can configure the new resource zone by sending a request, such as an API request, to the resource allocation monitor 118 on the host to assign the new zone a reserved amount of one or more resources. In some embodiments, the API request can be a Zone-PUT request which includes one or more "reserved_resource" parameters that define an amount of one or more resources that are reserved to the new zone. The reserved amount of resources may be specific to the type of compute instance that belongs to the zone. For example, larger compute instances may be associated with larger reserve amounts of resources while smaller compute instances may be associated with smaller reserve amounts of resources.

As the new compute instance 116 begins using resources, the resource usage can be reported to the resource allocation monitor 118, at numeral 2. The resource allocation monitor can perform one or resource availability checks before the use of a resource is allowed by the compute instance. For example, at numeral 3, the resource allocation monitor can determine whether the compute instance has already used the amount of the resource that was reserved to the compute instance. If not, then the usage is approved, and the monitor updates the current resource usage of the compute instance to reflect the additional resource usage. If the compute instance has used its reserved amount of the resource, the resource allocation monitor can determine whether there is availability in a shared resource pool. This check may include, for example, determining whether granting the additional allocation to the compute instance would still leave sufficient resources available to all of the compute instances on the host to meet their reserved resource allocations. If there is availability, then the additional resource allocation is granted. In some embodiments, a compute instance may be associated with a maximum resource usage limit for a given resource. In such embodiments, the resource allocation monitor can also determine whether the additional resource allocation would cause the compute instance to exceed this maximum threshold. Once these checks have been completed, at numeral 4 the resource allocation monitor can grant or deny the additional resource allocation to the requesting compute instance.

If granted, the compute instance can then use the additional resources that have been allocated to it and the resource allocation monitor can update the resource allocation and current resource usage for the host. For example, the resource allocation monitor 118 can maintain a data structure that indicates the reserve pool of a resource, the shared pool of the resource, and the current usage of the resource across the compute instances 116 on the host 110A. This data structure can be updated each time a new compute instance is added to the host and as the usage of the resource changes across the compute instances. In some embodiments, the resource allocation monitor can maintain a different data structure for each resource 112 of the host which the resource allocation monitor is tasked with monitoring and allocating across the compute instances 116.

As discussed, physical hosts 110 may be configured to host multiple compute instance types. Each compute instance type may be associated with different resource requirements (e.g., memory-optimized instances may have more dedicated Random-Access Memory (RAM), while a high-performance instance may have more dedicated Central Processing Units (CPUs)). In some embodiments, hosts 110 may include different host types. For example, host 110A may be a first host type and host 11B may be a different host type, and so on. Hosts of one host type may have different sets of host resources than hosts of a different host type. Additionally, in some embodiments, a particular host type may be configured to host compute instances of a particular compute instance type. Additionally, or alternatively, a given host type may be configured to host various different compute instance types. This may be referred to as a heterogeneous host, where a host of one physical host type can host various compute instance types. In the heterogeneous use case, the compute instances 116 on host 110A may each be of different types and may be associated with different resource requirements which may correspond to different reserve requirements. The amount of a resource reserved for a particular compute instance type may also vary depending on the host type to which it is deployed. For example, a first instance type may have a first amount of reserved resources when deployed on a first host type and a second amount of reserved resources when deployed on a second host types.

In some embodiments, the amount of one resource that is reserved for a given resource zone may be based on the amount of a different resource that has been reserved for that zone. For example, an amount of a connection caching resource may be allocated to a zone based on an amount of a connection tracking resource that has been allocated to the zone.

Figure 2:
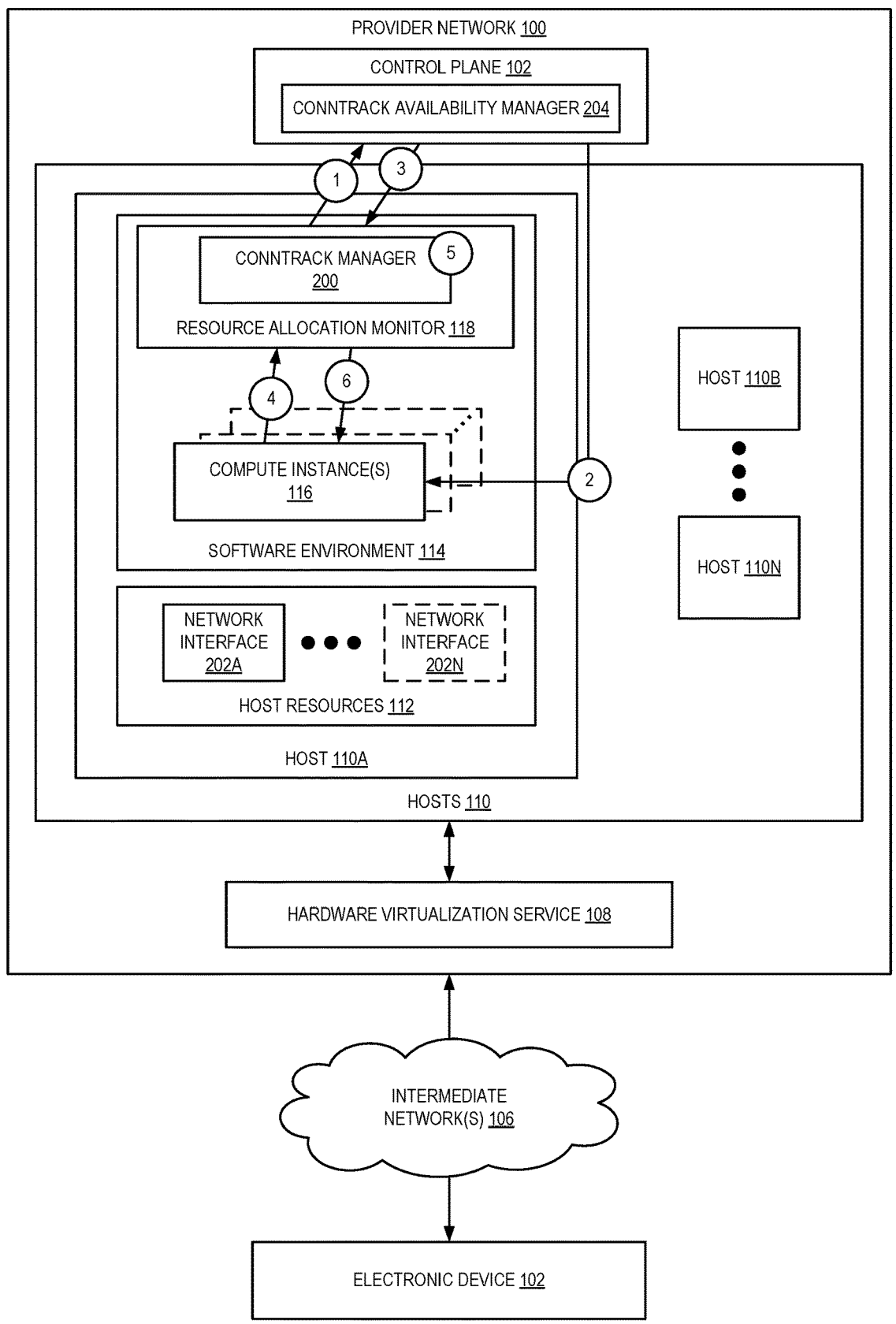
FIG. 2 is a diagram illustrating an environment for safe oversubscription of connection tracking entries according to some embodiments.

FIG. 2 is a diagram illustrating an environment for safe oversubscription of connection tracking entries according to some embodiments. As discussed above with respect to FIG. 1, resource allocation monitor 118 can manage various resources that are allocated to a compute instance on a host based on the underlying resources available on the host and the portion of the resources that have been allocated to other compute instances on the host. In the example of FIG. 2, connection track (e.g., "conntrack") entries are managed by a conntrack manager 200 of the resource allocation monitor 118. Conntrack entries may represent the total number of connections a host can use for connection tracking firewall policies. The conntrack entries track connection state for each connection, which allows for the system to ensure that packets being received are linked to a connection that was created by a compute instance. In some embodiments, the connection state may include TCP connection state for TCP connections, how long the connection has been alive, etc. Conntrack entries are maintained in a conntrack table or other data structure and may be limited as to how many a given host can support. As such, the resource allocation monitor 118 can ensure that a guaranteed number of conntrack entries are made available to each compute instances while also allowing compute instances to oversubscribe as needed.

The number of conntrack entries available on a given host may vary from host to host depending on the underlying resources 112 of that host 110A. For example, this may vary depending on the number of network interfaces 202A-202N on a given host. As discussed, the conntrack entries available on a host may be divided into a reserved pool and a shared pool. The reserved pool can be allocated among the compute instances hosted by the host and the shared pool can be allocated on a first come first serve basis. As an example, a host may support 4.9 million conntrack entries, and 96 compute instance slots. If divided evenly, this would allocate each compute instance about 51 thousand connection tracking entries. If the conntrack entries are divided into two equal pools (e.g., the reserved pool and the shared pool), then each compute instance could be reserved approximately 25 thousand conntrack entries, and share the remaining approximately 2.4 million conntrack entries in the reserve pool once they exceed their reserved 25 thousand conntrack entries.

As discussed, embodiments deny allocations to a compute instance if it has used more than its reserved limit, and there are not enough free entries in the host to cover all of the reservations associated with other compute instances on the host. This guarantees access to the reserved pool by all current or potential compute instances on the host. Additionally, as discussed, each compute instance may also be associated with a maximum limit of an amount of a particular resource that can be allocated to the compute instance (in this example, conntrack entries). This maximum limit controls how many conntrack entries a given compute instance can oversubscribe into.

In the example of FIG. 2, when a new compute instance is being added to a host, the control plane can obtain current resource allocation information from the resource allocation monitor 118, at numeral 1. In this example, the resource allocation information can include the number of reserved conntrack entries available on host 110A. Conntrack availability manager 204 can determine if there are sufficient reserved entries to meet the reserved requirements of the instance being placed. If so, at numeral 2, the new compute instance 116 can be added to host 110A. At numeral 3, the control plane can configure a conntrack zone on host 110A and assign the new compute instance 116 to the conntrack zone. The conntrack zone can be configured by sending a request, such as an API request, that indicates how many conntrack entries are reserved to that zone. In some embodiments, the API request can be a Zone-PUT request which includes a "reserved_entries" parameter that defines how many conntrack entries are reserved to the new zone. As discussed further below, in some embodiments, a compute instance may belong to more than one zone (e.g., depending on the number of network interfaces 202A-N that are associated with the instance) or the new compute instance may be added to an existing zone with one or more existing instances and share the reserved conntrack entries of that zone with the other instances.

As the new compute instance 116 begins establishing connections, conntrack entries are used. This conntrack usage can be reported to the conntrack manager 200 of resource allocation monitor 118, at numeral 4. The conntrack manager 200 can perform one or resource availability checks before the use of a conntrack entry is allowed by the compute instance. For example, at numeral 5, the conntrack manager 200 can determine whether the compute instance has already used the number of conntrack entries that were reserved to the compute instance. If not, then the connection is approved, and the monitor updates the current conntrack usage of the compute instance to reflect the additional conntrack usage. If the compute instance has used its reserved number of conntrack entries, the conntrack manager 200 can determine whether there is availability in a shared resource pool of conntrack entries. This check may include, for example, determining whether granting the additional allocation to the compute instance would still leave sufficient conntrack entries available to all of the compute instances on the host to meet their reserved conntrack entry allocations. If there is availability, then the additional conntrack entry allocation is granted. As discussed, in some embodiments, a compute instance may be associated with a maximum conntrack entry limit. In such embodiments, the conntrack manager 200 can also determine whether the additional conntrack entry allocation would cause the compute instance to exceed this maximum threshold. Once these checks have been completed, at numeral 6 the conntrack manager 200 can grant or deny the additional conntrack entry allocation to the requesting compute instance.

If granted, the compute instance can then open a new connection and use the newly allocated conntrack entry to track the connection's state. Additionally, the resource allocation monitor can update the conntrack allocation and current conntrack usage for the host. For example, the resource allocation monitor 118 can maintain a conntrack table that indicates the reserve pool of conntrack entries, the shared pool of conntrack entries, and the current usage of conntrack entries across the compute instances 116 on the host 110A. This data structure can be updated each time a new compute instance is added to the host and as each compute instance on the host opens new connections and as those connections time out or are otherwise closed.

Figure 3:
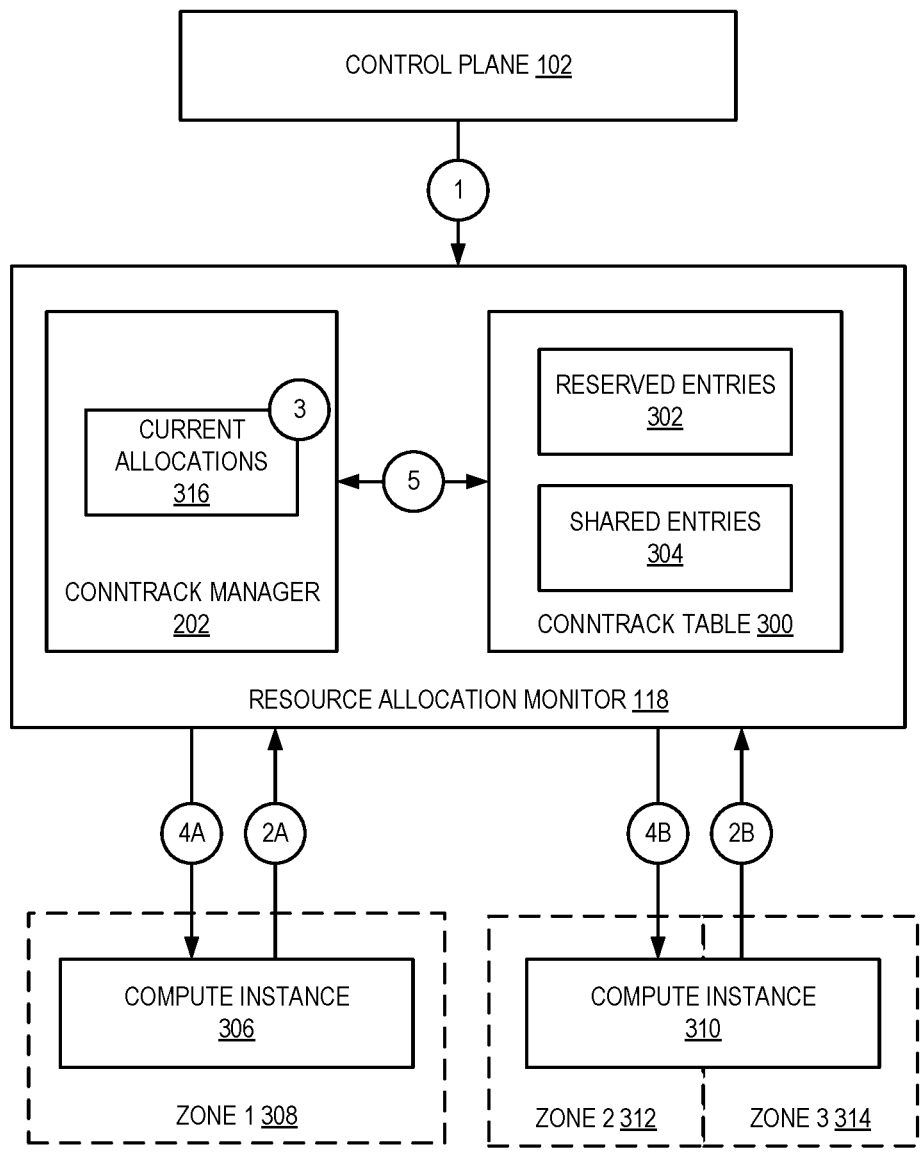
FIG. 3 is a diagram illustrating an example resource allocation monitor according to some embodiments.

FIG. 3 is a diagram illustrating an example resource allocation monitor according to some embodiments. As discussed, a resource allocation monitor can allocate and track usage of various resources of a host among the compute instances deployed to that host. For example, resource allocation monitor 118 can include a conntrack manager 202. Although the embodiment of FIG. 3 is discussed with respect to managing conntrack entries, similar embodiments may be used to manage other resources. When compute instances are launched on a host, such as compute instances 306 and 310, the control plane 102 can define resource zones on the host and set reserved resource amounts with each zone. For example, in the embodiment of FIG. 3, a resource, conntrack entries, can be maintained in a conntrack table 300. These entries can be logically divided into reserved entries 302 and shared entries 304. The reserved entries 302 can be allocated to each conntrack zone that is set up on the host. At numeral 1, the control plane can send a request to the resource allocation monitor 118 establishing at least one zone and defining the number of conntrack entries reserved to that zone. As discussed, the request may be an API request that includes a "reserved_entries" parameter defining how many conntrack entries are reserved to the zone.

In the example of FIG. 3, compute instance 306 is assigned to zone 1 308 and compute instance 310 is assigned to both zone 2 312 and zone 3 314. For example, compute instance 310 may be associated with multiple network interfaces. These may include physical or logical network interfaces that have been assigned to the compute instance 310. Each network interface may be associated with its own zone, and as a result the compute instance is associated with two zones. When compute instance 306 attempts to open a connection, it can send a request for a conntrack entry, at numeral 2A, to the resource allocation monitor. At numeral 3, conntrack manager 202 can determine whether the compute instance 306 has any remaining reserved conntrack entries based on the reserved entries associated with zone 1, which may be maintained in current allocations 316. As discussed, the conntrack manager can track the resources that have been allocated to a given resource zone both on a per compute instance basis and in aggregate for a host. If so, the conntrack entry is updated with the connection state and at numeral 4A, the compute instance is allocated a new conntrack entry and the connection is opened. If the zone does not have any remaining reserved conntrack entries, the conntrack manager can determine whether the compute instance can be allocated a conntrack entry from the shared entries pool. For example, if the zone 1 has not reached the maximum number of conntrack entries allocated to it or if there are sufficient entries in the shared entries pool to still guarantee the reserves of any other compute instance deployed to the host. If the zone 1 can be allocated an additional conntrack entry, then the conntrack entry is allocated and the connection is opened. At numeral 5, the allocated conntrack entry can be updated with connection state information. If not, the conntrack request is refused.

Similarly, when compute instance 310 attempts to open a connection, depending on which network interface is making the connection request at numeral 2B, the allocation for the corresponding zone is first checked to determine whether it can be allocated a new conntrack entry. At numeral 3, conntrack manager 202 can determine whether the requesting zone (e.g., zone 2 or zone 3) has any remaining reserved conntrack entries based on the reserved entries associated with the requesting zone, which may be maintained in current allocations 316. If so, the conntrack entry is updated with the connection state and at numeral 4B, the compute instance 310 is allocated a new conntrack entry and the connection is opened. If the zone does not have any remaining reserved conntrack entries, the conntrack manager can determine whether the requesting zone can be allocated a conntrack entry from the shared entries pool. For example, if the requesting zone has not reached the maximum number of conntrack entries allocated to it or if there are sufficient entries in the shared entries pool to still guarantee the reserves of any other compute instance deployed to the host. If the zone can be allocated an additional conntrack entry, then the conntrack entry is allocated and the connection is opened. At numeral 5, the allocated conntrack entry can be updated with connection state information. If not, the conntrack request is refused.

FIG. 4 is a diagram illustrating an example pseudocode algorithm 400 for safe oversubscription of connection tracking entries according to some embodiments. In various embodiments, the resource allocation monitor may implement an algorithm similar to that depicted in FIG. 4. Although the example of FIG. 4 is described with respect to conntrack entries, in various embodiments other resources may also be similarly allocated, as discussed herein. As shown in FIG. 4, at 402, the resource allocation monitor can determine whether the zone has exceeded the number of conntrack entries that have been reserved to the zone and, if so, that if additional entries beyond the reserved entries are allocated, that there are still sufficient conntrack entries available to satisfy the reserve allocation for other compute instances on the host. As shown in FIG. 4, at 404, the resource allocation monitor can determine whether the requesting zone has exceeded a maximum number of conntrack entries. If the maximum has been exceeded, then the request can be denied. Additionally, at 406, the resource allocation monitor can increment counters to keep track of conntrack usage. This may reflect host-wide usage statistics which can be used to determine whether there are sufficient conntrack entries remaining to meet the reserve guarantees for compute instances deployed on the host.

Figure 5:
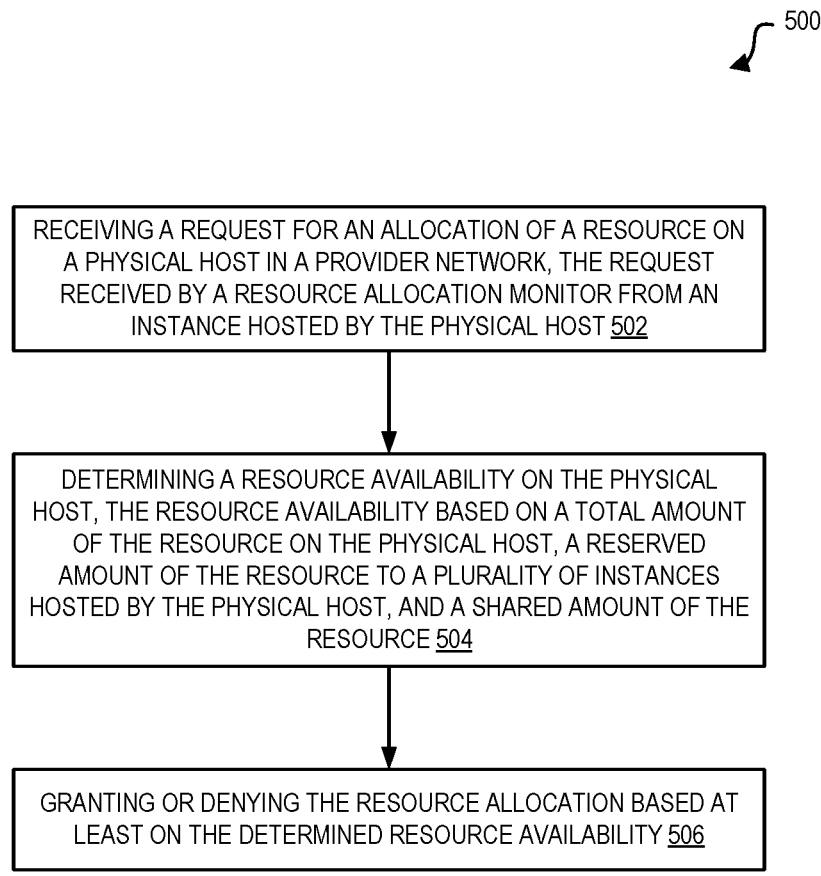
FIG. 5 is a flow diagram illustrating operations of a method for safe oversubscription of connection tracking entries according to some embodiments.

FIG. 5 is a flow diagram illustrating operations 500 of a method for safe oversubscription of connection tracking entries according to some embodiments. Some or all of the operations 500 (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations 500 are performed by resource allocation monitor 118, resource availability manager 120, control plane 102, conntrack manager 200, conntrack availability manager 204, etc. of the other figures.

The operations 500 include, at block 502, receiving a request for an allocation of a resource on a physical host in a provider network, the request received by a resource allocation monitor from an instance hosted by the physical host. As discussed, various resources available on a host can be allocated, including CPUs, GPUs, memory, disk space, connection tracking entries, connection caching entries, etc.

The operations 500 further include, at block 504, determining a resource availability on the physical host, the resource availability based on a total amount of the resource on the physical host, a reserved amount of the resource to a plurality of instances hosted by the physical host, and a shared amount of the resource. In some embodiments, the amount of the resource that is reserved for the resource zone is based at least on an instance type associated with the instance being associated with the resource zone.

The operations 500 further include, at block 506, granting or denying the resource allocation based at least on the determined resource availability. In some embodiments, granting or denying the resource allocation may further include granting the request when it is determined that the instance has available reserved resources based on the resource availability. In some embodiments, granting or denying the resource allocation may further include granting the request when it is determined that the instance has exceeded its reserved resources and that there are available shared resources based on the resource availability. In some embodiments, granting or denying the resource allocation may further include denying the request when it is determined that the instance has exceeded its reserved resources and that there are not available shared resources based on the resource availability. In some embodiments, granting or denying the resource allocation may further include denying the request when it is determined that the instance has exceeded its maximum resource allocation.

In some embodiments, the operations may further include receiving a request from a control plane in the provider network to create a resource zone on the physical host, the request indicating an amount of the resource that is reserved for the resource zone, and associating the instance with the resource zone. In some embodiments, the resource is connection tracking entries and/or the resource zone is a conntrack zone. In some embodiments, the instance includes at least two network interfaces, wherein a first network interface is associated with the conntrack zone and a second network interface is associated with a second conntrack zone, the conntrack zone and second conntrack zone each having a separate reserved number of conntrack entries.

In some embodiments, the operations may include receiving a request to create a conntrack zone on a physical host in a provider network, the request indicating a number of conntrack entries that are reserved to the conntrack zone, associating a compute instance with the conntrack zone, receiving a request for at least one conntrack entry from the compute instance by a resource allocation monitor, determining a conntrack availability on the physical host by the resource monitor, the conntrack availability based on a total amount of conntrack entries on the physical host, a total reserved amount of the conntrack entries that are reserved to a plurality of compute instances hosted by the physical host, and a shared amount of the conntrack entries that are shared by the plurality of compute instances hosted by the physical host, and granting the request for the at least one conntrack entry based at least on the determined conntrack availability, the conntrack availability indicating that the conntrack zone is associated with available reserved conntrack entries.

In some embodiments, the operations may further include receiving a second request for at least one second conntrack entry, determining a second conntrack availability, and granting the second request for the at least one second conntrack entry based at least on the determined second conntrack availability, the second conntrack availability indicating that the conntrack zone has exceeded its reserved conntrack entries and that there are available shared conntrack entries.

In some embodiments, the operations may further include receiving a second request for at least one second conntrack entry, determining a second conntrack availability, and denying the second request for the at least one second conntrack entry based at least on the determined second conntrack availability, the second conntrack availability indicating that the conntrack zone has exceeded its reserved conntrack entries and that there are not available shared conntrack entries.

Figure 6:
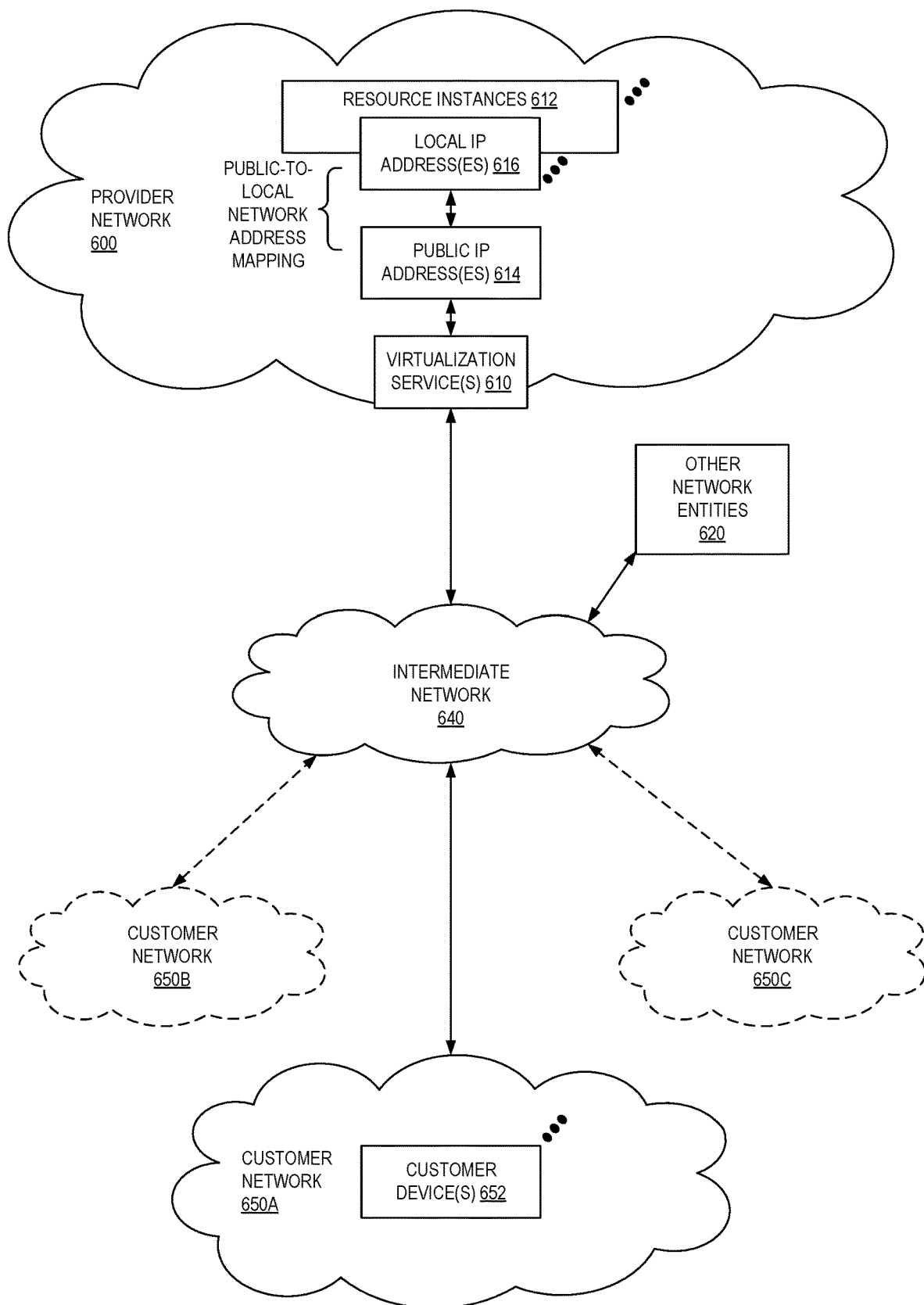
FIG. 6 illustrates an example provider network environment according to some embodiments.

FIG. 6 illustrates an example provider network (or "service provider system") environment according to some embodiments. A provider network 600 may provide resource virtualization to customers via one or more virtualization services 610 that allow customers to purchase, rent, or otherwise obtain instances 612 of virtualized resources, including but not limited to computation and storage resources, implemented on devices within the provider network or networks in one or more data centers. Local Internet Protocol (IP) addresses 616 may be associated with the resource instances 612; the local IP addresses are the internal network addresses of the resource instances 612 on the provider network 600. In some embodiments, the provider network 600 may also provide public IP addresses 614 and/or public IP address ranges (e.g., Internet Protocol version 4 (IPv4) or Internet Protocol version 6 (IPv6) addresses) that customers may obtain from the provider network 600.

Conventionally, the provider network 600, via the virtualization services 610, may allow a customer of the service provider (e.g., a customer that operates one or more client networks 650A-650C including one or more customer device(s) 652) to dynamically associate at least some public IP addresses 614 assigned or allocated to the customer with particular resource instances 612 assigned to the customer. The provider network 600 may also allow the customer to remap a public IP address 614, previously mapped to one virtualized computing resource instance 612 allocated to the customer, to another virtualized computing resource instance 612 that is also allocated to the customer. Using the virtualized computing resource instances 612 and public IP addresses 614 provided by the service provider, a customer of the service provider such as the operator of customer network(s) 650A-650C may, for example, implement customer-specific applications and present the customer's applications on an intermediate network 640, such as the Internet. Other network entities 620 on the intermediate network 640 may then generate traffic to a destination public IP address 614 published by the customer network(s) 650A-650C; the traffic is routed to the service provider data center, and at the data center is routed, via a network substrate, to the local IP address 616 of the virtualized computing resource instance 612 currently mapped to the destination public IP address 614. Similarly, response traffic from the virtualized computing resource instance 612 may be routed via the network substrate back onto the intermediate network 640 to the source entity 620.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193 and may be mutable within the provider network. Network traffic originating outside the provider network is not directly routed to local IP addresses; instead, the traffic uses public IP addresses that are mapped to the local IP addresses of the resource instances. The provider network may include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses may be assigned by the provider network infrastructure to particular resource instances; these public IP addresses may be referred to as standard public IP addresses, or simply standard IP addresses. In some embodiments, the mapping of a standard IP address to a local IP address of a resource instance is the default launch configuration for all resource instance types.

At least some public IP addresses may be allocated to or obtained by customers of the provider network 600; a customer may then assign their allocated public IP addresses to particular resource instances allocated to the customer. These public IP addresses may be referred to as customer public IP addresses, or simply customer IP addresses. Instead of being assigned by the provider network 600 to resource instances as in the case of standard IP addresses, customer IP addresses may be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 7:
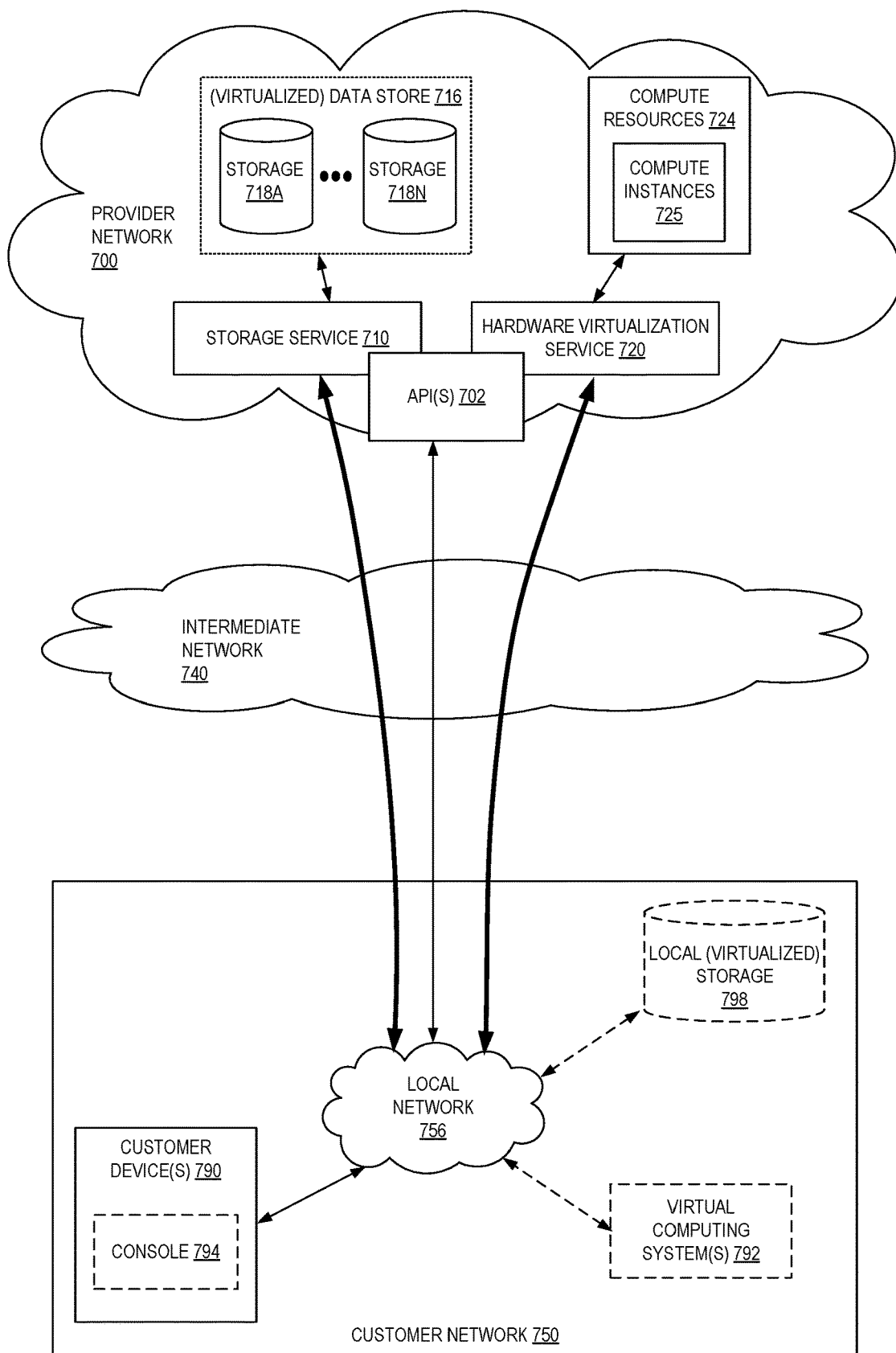
FIG. 7 is a block diagram of an example provider network that provides a storage service and a hardware virtualization service to customers according to some embodiments.

FIG. 7 is a block diagram of an example provider network that provides a storage service and a hardware virtualization service to customers, according to some embodiments. Hardware virtualization service 720 provides multiple compute resources 724 (e.g., compute instances 725 such as VMs) to customers. The compute resources 724 may, for example, be rented or leased to customers of the provider network 700 (e.g., to a customer that implements customer network 750). Each computation resource 724 may be provided with one or more local IP addresses. Provider network 700 may be configured to route packets from the local IP addresses of the compute resources 724 to public Internet destinations, and from public Internet sources to the local IP addresses of compute resources 724.

Provider network 700 may provide a customer network 750, for example coupled to intermediate network 740 via local network 756, the ability to implement virtual computing systems 792 via hardware virtualization service 720 coupled to intermediate network 740 and to provider network 700. In some embodiments, hardware virtualization service 720 may provide one or more APIs 702, for example a web services interface, via which a customer network 750 may access functionality provided by the hardware virtualization service 720, for example via a console 794 (e.g., a web-based application, standalone application, mobile application, etc.). In some embodiments, at the provider network 700, each virtual computing system 792 at customer network 750 may correspond to a computation resource 724 that is leased, rented, or otherwise provided to customer network 750.

From an instance of a virtual computing system 792 and/or another customer device 790 (e.g., via console 794), the customer may access the functionality of storage service 710, for example via one or more APIs 702, to access data from and store data to storage resources 718A-718N of a virtual data store 716 (e.g., a folder or "bucket", a virtualized volume, a database, etc.) provided by the provider network 700. In some embodiments, a virtualized data store gateway (not shown) may be provided at the customer network 750 that may locally cache at least some data, for example frequently-accessed or critical data, and that may communicate with storage service 710 via one or more communications channels to upload new or modified data from a local cache so that the primary store of data (virtualized data store 716) is maintained. In some embodiments, a user, via a virtual computing system 792 and/or on another customer device 790, may mount and access virtual data store 716 volumes via storage service 710 acting as a storage virtualization service, and these volumes may appear to the user as local (virtualized) storage 798.

While not shown in FIG. 7, the virtualization service(s) may also be accessed from resource instances within the provider network 700 via API(s) 702. For example, a customer, appliance service provider, or other entity may access a virtualization service from within a respective virtual network on the provider network 700 via an API 702 to request allocation of one or more resource instances within the virtual network or within another virtual network.

Illustrative Systems

Figure 8:
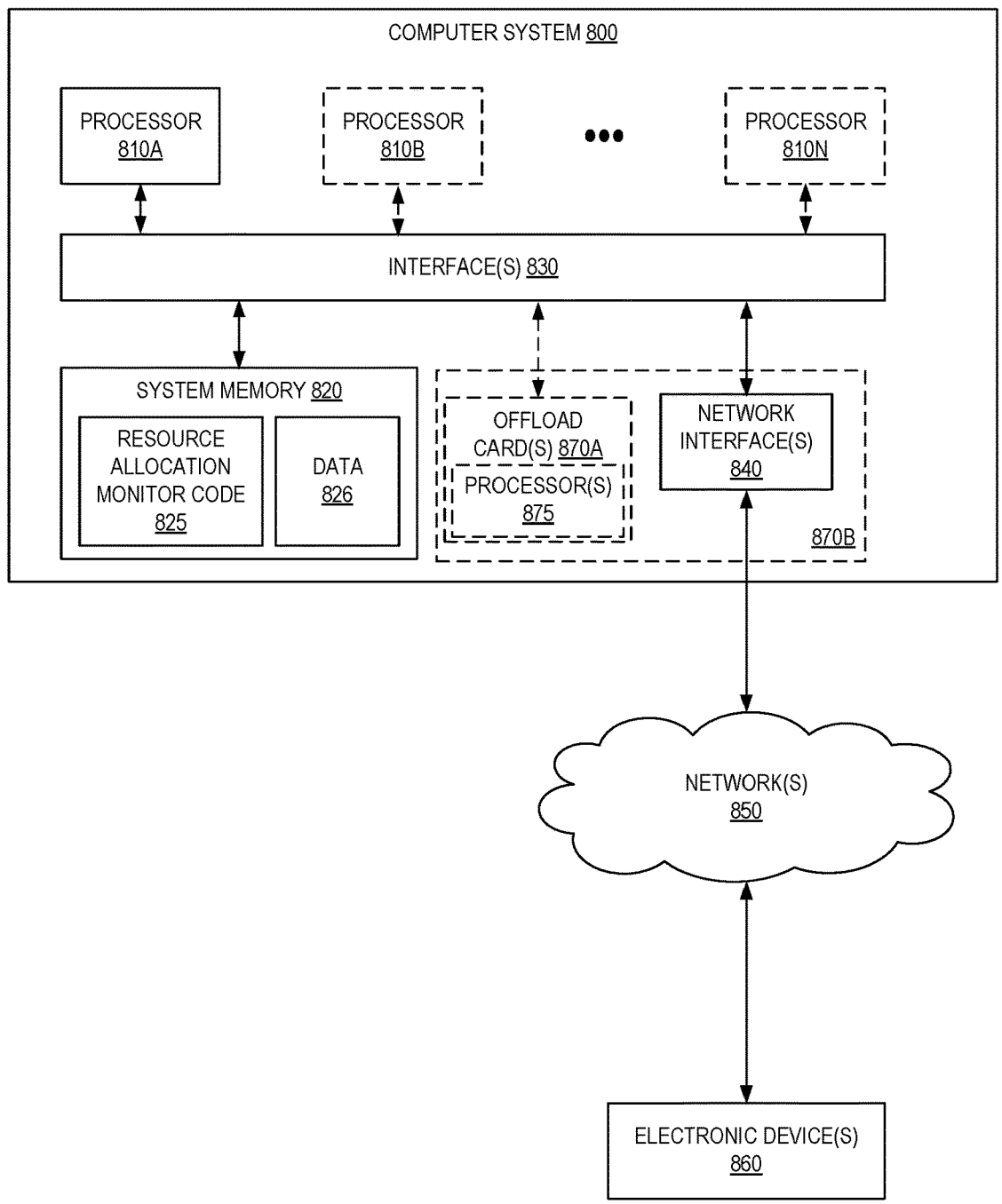
FIG. 8 is a block diagram illustrating an example computer system that may be used in some embodiments.

In some embodiments, a system that implements a portion or all of the techniques described herein may include a general-purpose computer system that includes or is configured to access one or more computer-accessible media, such as computer system 800 illustrated in FIG. 8. In the illustrated embodiment, computer system 800 includes one or more processors 810 coupled to a system memory 820 via an input/output (I/O) interface 830. Computer system 800 further includes a network interface 840 coupled to I/O interface 830. While FIG. 8 shows computer system 800 as a single computing device, in various embodiments a computer system 800 may include one computing device or any number of computing devices configured to work together as a single computer system 800.

In various embodiments, computer system 800 may be a uniprocessor system including one processor 810, or a multiprocessor system including several processors 810 (e.g., two, four, eight, or another suitable number). Processors 810 may be any suitable processors capable of executing instructions. For example, in various embodiments, processors 810 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 810 may commonly, but not necessarily, implement the same ISA.

System memory 820 may store instructions and data accessible by processor(s) 810. In various embodiments, system memory 820 may be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above are shown stored within system memory 820 as resource allocation monitor code 825 (e.g., executable to implement, in whole or in part, the resource allocation monitor 118) and data 826.

In one embodiment, I/O interface 830 may be configured to coordinate I/O traffic between processor 810, system memory 820, and any peripheral devices in the device, including network interface 840 or other peripheral interfaces. In some embodiments, I/O interface 830 may perform any necessary protocol, timing or other data transformations to convert data signals from one component (e.g., system memory 820) into a format suitable for use by another component (e.g., processor 810). In some embodiments, I/O interface 830 may include support for devices attached through various types of peripheral buses, such as a variant of the Peripheral Component Interconnect (PCI) bus standard or the Universal Serial Bus (USB) standard, for example. In some embodiments, the function of I/O interface 830 may be split into two or more separate components, such as a north bridge and a south bridge, for example. Also, in some embodiments some or all of the functionality of I/O interface 830, such as an interface to system memory 820, may be incorporated directly into processor 810.

Network interface 840 may be configured to allow data to be exchanged between computer system 800 and other devices 860 attached to a network or networks 850, such as other computer systems or devices as illustrated in FIG. 1, for example. In various embodiments, network interface 840 may support communication via any suitable wired or wireless general data networks, such as types of Ethernet network, for example. Additionally, network interface 840 may support communication via telecommunications/telephony networks such as analog voice networks or digital fiber communications networks, via storage area networks (SANs) such as Fibre Channel SANs, or via I/O any other suitable type of network and/or protocol.

In some embodiments, a computer system 800 includes one or more offload cards 870A or 870B (including one or more processors 875, and possibly including the one or more network interfaces 840) that are connected using an I/O interface 830 (e.g., a bus implementing a version of the Peripheral Component Interconnect-Express (PCI-E) standard, or another interconnect such as a QuickPath interconnect (QPI) or UltraPath interconnect (UPI)). For example, in some embodiments the computer system 800 may act as a host electronic device (e.g., operating as part of a hardware virtualization service) that hosts compute resources such as compute instances, and the one or more offload cards 870A or 870B execute a virtualization manager that can manage compute instances that execute on the host electronic device. As an example, in some embodiments the offload card(s) 870A or 870B can perform compute instance management operations such as pausing and/or un-pausing compute instances, launching and/or terminating compute instances, performing memory transfer/copying operations, etc. These management operations may, in some embodiments, be performed by the offload card(s) 870A or 870B in coordination with a hypervisor (e.g., upon a request from a hypervisor) that is executed by the other processors 810A-810N of the computer system 800. However, in some embodiments the virtualization manager implemented by the offload card(s) 870A or 870B can accommodate requests from other entities (e.g., from compute instances themselves), and may not coordinate with (or service) any separate hypervisor.

In some embodiments, system memory 820 may be one embodiment of a computer-accessible medium configured to store program instructions and data as described above. However, in other embodiments, program instructions and/ or data may be received, sent, or stored upon different types of computer-accessible media. Generally speaking, a computer-accessible medium may include non-transitory storage media or memory media such as magnetic or optical media, e.g., disk or DVD/CD coupled to computer system 800 via I/O interface 830. A non-transitory computer-accessible storage medium may also include any volatile or non-volatile media such as RAM (e.g., SDRAM, double data rate (DDR) SDRAM, SRAM, etc.), read only memory (ROM), etc., that may be included in some embodiments of computer system 800 as system memory 820 or another type of memory. Further, a computer-accessible medium may include transmission media or signals such as electrical, electromagnetic, or digital signals, conveyed via a communication medium such as a network and/or a wireless link, such as may be implemented via network interface 840.

Various embodiments discussed or suggested herein can be implemented in a wide variety of operating environments, which in some cases can include one or more user computers, computing devices, or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and/or other devices capable of communicating via a network.

Most embodiments utilize at least one network that would be familiar to those skilled in the art for supporting communications using any of a variety of widely-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In embodiments utilizing a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, PHP, or TCL, as well as combinations thereof. The server(s) may also include database servers, including without limitation those commercially available from Oracle®, Microsoft®, Sybase®, IBM®, etc. The database servers may be relational or non-relational (e.g., "NoSQL"), distributed or non-distributed, etc.

Environments disclosed herein can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system may also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters (e.g., 718A-718N) may be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method comprising:
   receiving a request to create a conntrack zone on a physical host in a provider network, the request indicating a number of conntrack entries that are reserved to the conntrack zone;
   associating a compute instance with the conntrack zone;
   receiving a request for at least one conntrack entry from the compute instance by a resource allocation monitor;
   determining a conntrack availability on the physical host by the resource allocation monitor, the conntrack availability based on a total amount of conntrack entries on the physical host, a total reserved amount of the conntrack entries that are reserved to a plurality of compute instances hosted by the physical host, and a shared amount of the conntrack entries that are shared by the plurality of compute instances hosted by the physical host; and
   granting the request for the at least one conntrack entry based at least on the determined conntrack availability, the conntrack availability indicating that the conntrack zone is associated with available reserved conntrack entries.

2. The computer-implemented method of claim 1, further comprising:
   receiving a second request for at least one second conntrack entry;
   determining a second conntrack availability; and
   granting the second request for the at least one second conntrack entry based at least on the determined second conntrack availability, the second conntrack availability indicating that the conntrack zone has exceeded its reserved conntrack entries and that there are available shared conntrack entries.

3. The computer-implemented method of claim 1, further comprising:
   receiving a second request for at least one second conntrack entry;
   determining a second conntrack availability; and
   denying the second request for the at least one second conntrack entry based at least on the determined second conntrack availability, the second conntrack availability indicating that the conntrack zone has exceeded its reserved conntrack entries and that there are not available shared conntrack entries.

4. A computer-implemented method comprising:
   receiving a request for an allocation of a resource on a physical host in a provider network, the request received by a resource allocation monitor from an instance hosted by the physical host;
   determining a resource availability on the physical host, the resource availability based on a total amount of the resource on the physical host, a reserved amount of the resource to a plurality of instances hosted by the physical host, and a shared amount of the resource; and
   granting or denying the resource allocation based at least on the determined resource availability.

5. The computer-implemented method of claim 4, further comprising:
   receiving a request from a control plane in the provider network to create a resource zone on the physical host, the request indicating an amount of the resource that is reserved for the resource zone; and
   associating the instance with the resource zone.

6. The computer-implemented method of claim 5, wherein the resource is connection tracking entries.

7. The computer-implemented method of claim 6, wherein the resource zone is a conntrack zone.

8. The computer-implemented method of claim 7, wherein the instance includes at least two network interfaces, wherein a first network interface is associated with the conntrack zone and a second network interface is associated with a second conntrack zone, the conntrack zone and second conntrack zone each having a separate reserved number of conntrack entries.

9. The computer-implemented method of claim 5, wherein the amount of the resource that is reserved for the resource zone is based at least on an instance type associated with the instance being associated with the resource zone.

10. The computer-implemented method of claim 4, wherein granting or denying the resource allocation based at least on the determined resource availability further comprises:
    granting the request when it is determined that the instance has available reserved resources based on the resource availability.

11. The computer-implemented method of claim 4, wherein granting or denying the resource allocation based at least on the determined resource availability further comprises:
  granting the request when it is determined that the instance has exceeded its reserved resources and that there are available shared resources based on the resource availability.

12. The computer-implemented method of claim 4, wherein granting or denying the resource allocation based at least on the determined resource availability further comprises:
  denying the request when it is determined that the instance has exceeded its reserved resources and that there are not available shared resources based on the resource availability.

13. The computer-implemented method of claim 4, wherein granting or denying the resource allocation based at least on the determined resource availability further comprises:
  denying the request when it is determined that the instance has exceeded its maximum resource allocation.

14. A system comprising:
  a first one or more electronic devices to implement a control plane in a multi-tenant provider network; and
  a second one or more electronic devices to implement a hardware virtualization service in the multi-tenant provider network, each host of the hardware virtualization service including a resource allocation monitor including instructions that upon execution cause the resource allocation monitor to:
    receive a request for an allocation of a resource on a physical host in the multi-tenant provider network;
    determine a resource availability on the physical host, the resource availability based on a total amount of the resource on the physical host, a reserved amount of the resource to a plurality of instances hosted by the physical host, and a shared amount of the resource; and
    grant or deny the resource allocation based at least on the determined resource availability.

15. The system of claim 14, wherein the instructions, when executed, further cause the resource allocation monitor to:
  receive a request from the control plane to create a resource zone on the physical host, the request indicating an amount of the resource that is reserved for the resource zone; and
  associate the instance with the resource zone.

16. The system of claim 15, wherein the resource is connection tracking entries and wherein the resource zone is a conntrack zone.

17. The system of claim 14, wherein to grant or deny the resource allocation based at least on the determined resource availability, the instructions, when executed, further cause the resource allocation monitor to:
  grant the request when it is determined that the instance has available reserved resources based on the resource availability.

18. The system of claim 14, wherein to grant or deny the resource allocation based at least on the determined resource availability, the instructions, when executed, further cause the resource allocation monitor to:
  grant the request when it is determined that the instance has exceeded its reserved resources and that there are available shared resources based on the resource availability.

19. The system of claim 14, wherein to grant or deny the resource allocation based at least on the determined resource availability, the instructions, when executed, further cause the resource allocation monitor to:
  deny the request when it is determined that the instance has exceeded its reserved resources and that there are not available shared resources based on the resource availability.

20. The system of claim 14, wherein to grant or deny the resource allocation based at least on the determined resource availability, the instructions, when executed, further cause the resource allocation monitor to:
  deny the request when it is determined that the instance has exceeded its maximum resource allocation.

* * * * *